(12) United States Patent  
Hunt

(10) Patent No.: US 9,292,978 B2
(45) Date of Patent: Mar. 22, 2016

(54) METHOD AND APPARATUS FOR REDUCING DATA TRANSFER RATES FROM A VEHICLE DATA LOGGER WHEN A QUALITY OF THE CELLULAR OR SATELLITE LINK IS POOR

(71) Applicant: ZONAR SYSTEMS, INC., Seattle, WA (US)

(72) Inventor: Bryan Hunt, Seattle, WA (US)

(73) Assignee: ZONAR SYSTEMS, INC., Seattle, WA (US)

(*) Notice: Subject to any disclaimer, the term of this patent is extended or adjusted under 35 U.S.C. 154(b) by 0 days.

(21) Appl. No.: 14/204,111

(22) Filed: Mar. 11, 2014

(65) Prior Publication Data

US 2014/0277831 A1 Sep. 18, 2014

Related U.S. Application Data

(60) Provisional application No. 61/793,248, filed on Mar. 15, 2013.

(51) Int. Cl.
| | | |
|---|---|---|
| *G06F 17/00* | (2006.01) |
| *G07C 5/00* | (2006.01) |
| *G07C 5/08* | (2006.01) |
| *G06F 19/00* | (2011.01) |
| *D06F 39/00* | (2006.01) |
| *G01S 5/02* | (2010.01) |
| *G01S 5/06* | (2006.01) |
| *G01M 17/02* | (2006.01) |
| *G06K 7/10* | (2006.01) |
| *G04G 7/00* | (2006.01) |

(52) U.S. Cl.
CPC .............. *G07C 5/008* (2013.01); *D06F 39/005* (2013.01); *G01M 17/02* (2013.01); *G01S 5/02* (2013.01); *G01S 5/021* (2013.01); *G01S 5/06* (2013.01); *G04G 7/02* (2013.01); *G06F 17/00* (2013.01); *G06F 19/00* (2013.01); *G06K 7/10178* (2013.01); *G07C 5/085* (2013.01)

(58) Field of Classification Search
CPC ........... G06F 15/16; G06F 17/00; G06F 9/54; G06F 11/3495; G06F 19/00; H04L 67/04; H04L 67/02; G07C 5/008; G07C 5/02; G07C 5/08; G07C 5/085; H04Q 7/00; G01S 5/06; G01S 5/02; G01S 5/021; G01M 17/02; B60C 23/041; G06K 7/10178
See application file for complete search history.

(56) References Cited

U.S. PATENT DOCUMENTS

| | | | |
|---|---|---|---|
| 2004/0017312 A1* | 1/2004 | Anderson | G01S 5/02 342/457 |
| 2005/0089052 A1* | 4/2005 | Chen et al. | 370/401 |
| 2006/0129691 A1* | 6/2006 | Coffee | H04L 67/04 709/230 |
| 2006/0182055 A1* | 8/2006 | Coffee et al. | 370/328 |

* cited by examiner

*Primary Examiner* — Behrang Badii
(74) *Attorney, Agent, or Firm* — Michael C. King

(57) ABSTRACT

System and method for reducing data transfer rates when a quality of the cellular or satellite link (i.e., a long range wireless data link) is poor. Such a concept is particularly well suited to embodiments where the vehicle data being logged or collected includes position data, because consumers of vehicle data that includes position data often desire to have such data exported from the vehicle on frequent basis, so that the physical location of fleet vehicles can be tracked in real-time. In one embodiment, before transmitting data a current location of the vehicle is checked against known bad locations, and no data is sent when the current location is known to be bad. In another embodiment, if successful data transmission is not confirmed during a first time period, additional transmission attempts are delayed for a second time period.

12 Claims, 4 Drawing Sheets

METHOD AND APPARATUS FOR REDUCING DATA TRANSFER RATES FROM A VEHICLE DATA LOGGER WHEN A QUALITY OF THE CELLULAR OR SATELLITE LINK IS POOR

RELATED APPLICATIONS

This application is based on a prior provisional application; Ser. No. 61/793,248, filed on Mar. 15, 2013, the benefit of the filing date of which is hereby claimed under 35 U.S.C. §119(e).

BACKGROUND

As the cost of sensors, processors, communications systems and navigational systems has dropped, operators of commercial and fleet vehicles now have the ability to collect a tremendous amount of data about the vehicles that they operate. The volume of data available is so significant that it would be desirable to provide method and apparatus to facilitate collecting relatively more data during unusual operating conditions, and relatively less data during normal vehicle operation.

SUMMARY

One aspect of the novel concepts presented herein is a system and method for reducing data transfer rates between a vehicle and a remote data center when a quality of a cellular or satellite link (i.e., a long range wireless data link) is poor. Such a concept is particularly well suited to embodiments where vehicle data being logged or collected includes position data, because consumers of vehicle data that includes position data often desire to have such data exported from the vehicle on frequent basis, so that the physical location of fleet vehicles can be tracked in real-time. However, it should be understood that such a concept could be implemented even where position data is not part of the vehicle data.

Long range wireless data links generally are designed to be able to determine when a wireless data link is available, such that data is transmitted only when a wireless data link is available, and if the wireless data link is unavailable, no data transmission is attempted (the data is stored for later transmission, a technique referred to as store forward). However, there are occasions when a wireless data link is available, but is of such poor quality, that data packets are lost in transmission. Consider a telematics system including data collection components at a vehicle (which can include one or more of a GPS sensor and other vehicle performance data sensors, including a data link coupling a vehicle telematics unit to a vehicle data bus and/or vehicle controller, such as an ECU), a long range wireless data link (such as a cellular or satellite data link), and a remote computing device for archiving and/or analyzing data collected from the vehicle. In such a system, when a data packet is conveyed from the vehicle to the remote computing device, the remote computing device can use the long range wireless data link to send a confirmation to the vehicle that the data packet transmission was successful. Such confirmations can be very compact (perhaps a hash of the data packet that was sent), such that the relative cost of transmission of the confirmation is relatively low. When a controller at the vehicle responsible for the data transmission fails to receive such a confirmation (generally such a controller is part of a vehicle telematics unit, although it should be understood that some other controller at the vehicle can be assigned this task), the data packet can be resent. When the wireless data link is available, but of relatively poor quality, packets can be transmitted multiple times before being successfully received, increasing the amount of airtime (or satellite) time being consumed, driving up costs (airtime/satellite time is often billed per byte or megabyte of data transferred, and failed transmissions are still billed).

The concepts disclosed herein address this issue of reducing unsuccessful data transmissions by changing the logic in the controller at the vehicle managing the data transmission. In one embodiment, if two data packets are not successfully transmitted (i.e., confirmations from the remote server/computing device are not received at the vehicle for the transmitted packets) within a first predetermined period of time, a time out (corresponding to a second predetermined period of time) for subsequent data transmissions is imposed. In an exemplary embodiment, the first predetermined period of time period is five minutes, and the second predetermined period of time is ten minutes, although such time periods are exemplary and not limiting. It should be understood that the first and second predetermined periods of time can be equal in length, or different in length. In some embodiments, the first predetermined period of time is longer than the second predetermined period of time. In other embodiments, the first predetermined period of time is shorter than the second predetermined period of time. It should also be understood that the number of failed transmissions that are required to trigger such a time out can be modified as desired; thus the two failed transmissions discussed in this paragraph is intended to be exemplary, and not limiting. The time out can be imposed based on a single failed transmission, or more than two failed transmissions.

In a related embodiment, one or more of the first and second predetermined periods of time can be modified by the controller managing the data transmission. For example, the first predetermined period of time can initially be relatively short, and if the problem of failed data transmissions continues, the duration of the first predetermined period of time can be increased, to further reduce costs associated with failed data transmissions. The duration of the second predetermined period of time can be similarly modified. The durations of the first and second predetermined periods of time can be extended together, or independently of each other. Similarly, the number of failed attempts before a time out is triggered can also be modified. For example, the number of failed attempts can start out at a first value, and that value can be reduced as the problem of failed transmissions continues.

In a related embodiment, the telematics system (which includes a plurality of vehicles having data collection components (each including a GPS or position sensing component), and a remote computing device or server where the data is stored and/or analyzed), learns over time the locations associated with failed data transmissions. Each time a vehicle fails to receive a confirmation that a data packet was transmitted successfully to the remote server, a location associated with the failed transmission is recorded in a memory at the vehicle. When successful connection with the remote computing device is available, that location data is communicated to the remote computing device, which generates a record of locations associated with data transmission failures. Over time, a map of locations where data transmission failures occur will be developed. Those locations can be provided to the data transmission controller at the participating vehicles, so that data transmission is not attempted in those locations. Recognizing that some data transmission failures are random, and not indicative that there is an ongoing problem with data link quality at the location, such a database of locations can give more weight to locations associated with multiple data transmission failures. In one embodiment, a location is not defined as a do not attempt to transmit data from here location until more than one data transmission failure is associated with that location (and in some embodiments, such failed attempts must be from different vehicles, and/or on different dates). It should be understood that the number of times a failed transmission needs to occur at a particular location before that location is added to a set of locations defined as a do not attempt to transmit data from here location can be adjusted to suit user preference. As the set of locations defined as do not attempt to transmit data from here locations changes over time, that set (or additions/deletions from that set) can be sent from the remote computing device to each enrolled vehicle using the wireless data link. Such updating can be part of an existing firmware update schedule, or a dedicated update.

In at least one embodiment, a specific location is not added to the set of do not attempt to transmit data from here locations unless that location is associated with two different transmission failures on two different dates. In at least one embodiment, a specific location is not added to the set of do not attempt to transmit data from here locations unless that location is associated with two different transmission failures from two different vehicles.

With respect to the set of locations defined as do not attempt to transmit data from here locations, it should be understood that a correction factor can be applied to expand the area from which data transmission will not be attempted. For example, assume location A having a specific latitude and longitude is defined as a location from which data transmission should not be attempted. An expansion factor can be applied to that location, such that data transmission will not be attempted when a vehicle is within some predefined distance of that location. For example, the controller or processor at the vehicle tasked with controlling transmission of data packets can be configured to hold for later transmission any data packet normal operations would cause to be transmitted when the vehicle is within 1 kilometer of a location defined as a do not attempt to transmit data from here location. It should be understood that 1 kilometer parameter is exemplary, and other distances (smaller or larger) can also be selected. Whatever distance is selected should take into account the GPS margin of error, such that the selected expansion factor is larger than the margin of error.

The expansion factor concept can be implemented in various ways. In one embodiment, the expansion factor is applied to the current vehicle location, and no data transmission will be made if a known bad location is encompassed in the expanded current vehicle location. In other embodiments, the bad locations themselves are expanded. In still another embodiment, the logic is implemented as follows: (a) automatically determining a known poor location closest to the current vehicle location; (b) automatically applying an expansion factor to closest known poor location; and (c) automatically determining if the expanded closest known poor location corresponds to the current location of the vehicle, and if so, then automatically storing the collected vehicle data for transmission from a different location.

In addition to being implemented as a method, the concepts disclosed herein can also be implemented as a memory medium storing machine instructions, which when executed by a processor implement the method, and by a system for implementing the method. In such a system, the basic elements include a remote computing device where vehicle data from enrolled vehicles can be stored/analyzed (which in some embodiments includes GPS data), a vehicle that is to be operated by a vehicle operator, optional data collection components in the vehicle (sensors/controllers for detecting specific predefined parameters), a wireless data link (such as a cellular or satellite based data link), a geographical position tracking unit (such as a GPS tracking device, noting that the transmission error concepts disclosed herein can be used even when the vehicle data does not include GPS data), and a processor at the vehicle for controlling when vehicle data is conveyed from the vehicle to the remote computing device. The system can, and preferentially does, include a plurality of vehicles, each including, the wireless data link, the GPS tracking device (in embodiments where the vehicle data includes location data), and the processor for controlling when GPS data (or other vehicle data) is conveyed from the vehicle to the remote computing device. In at least some embodiments, the data link, GPS component, and processor are integrated into a single device (which can be implemented by one or more of a smart phone, a mobile computing device, a mobile telematics device, and a telematics device more or less permanently installed in the vehicle). The processor at the vehicle implements functions generally consistent with the method discussed above, in which the transmission of GPS data (or vehicle data) is changed (generally reduced or temporarily halted in an exemplary embodiment) when transmission confirmations fail to be received from the remote computing device. In general, the remote computing device can be implemented by a computing system employed by an entity operating a fleet of vehicles, as well as a website operated by a third party. It should be noted that one aspect of the concepts disclosed herein involves the processor at the remote computing device implementing the function of generating and updating a data set of locations from which data transmission should not be attempted, and forwarding that data set to each enrolled vehicle according to a predetermined schedule. Entities that operate vehicle fleets can thus use such computing systems/websites to track and process data relating to their vehicle fleet. It should be recognized that these basic elements can be combined in many different configurations to achieve the exemplary method discussed above. Thus, the details provided herein are intended to be exemplary, and not limiting on the scope of the concepts disclosed herein.

In at least one exemplary method, exemplary steps include (a) providing a list of location for which data link quality is known to be poor; (b) collecting vehicle data from the vehicle during vehicle operation according to a defined logging paradigm; (c) before transmitting the collected data to a remote computing site, determining if a current position of the vehicle corresponds to the provided list of poor data link locations; and (d) if the current location corresponds to a poor location, then storing the collected data for transmission from a different location. The concepts disclosed herein encompass a non-transitory memory medium having machine instructions stored thereon for carrying out such method steps.

The concepts disclosed herein also encompass a geographical position system for use in a vehicle, the geographical position system including (a) a positioning sensing component for collecting geographical position data from the vehicle during vehicle operation, the geographical position data being time indexed, (b) a memory in which a list of locations associated with poor data link quality is stored, (c) a wireless data link; and (d) a processor for implementing the functions of: (i) collecting vehicle data from the vehicle during vehicle operation, (ii) before transmitting the collected data to a remote computing site, determining if a current position of the vehicle corresponds to the provided list of poor data link locations; and (iii) if the current location corresponds to a poor location, then storing the collected data for transmission from a different location.

The concepts disclosed herein further encompass a method for reducing data transfer rates when a quality of the cellular or satellite link (i.e., a long range wireless data link) is poor. Such a concept is particularly well suited to embodiments where the vehicle data being logged or collected includes position data, because consumers of vehicle data that includes position data often desire to have such data exported from the vehicle on frequent basis, so that the physical location of fleet vehicles can be tracked in real-time. However, it should be understood that such a concept could be implemented even where position data is not part of the vehicle data.

The above noted methods are preferably implemented by a processor (such as computing device implementing machine instructions to implement the specific functions noted above) or a custom circuit (such as an application specific integrated circuit). The processor or custom circuit is disposed at the vehicle. The processor can be part of a smart phone, a mobile computing device, a vehicle ECU, a GPS tracking device, or a telematics device.

In at least some related embodiments, the vehicle data will include position data. In some such embodiments, a combination GSM device and GPS device is used to collect vehicle position data and to convey that position data to a remote computing device for storage, review and/or analysis. As noted above, there is a tradeoff between collecting too much data (transmission costs are relatively high) and collecting too little data (value added analytics cannot be achieved without sufficient data). The concepts disclosed herein relate to method and apparatus to enable the data collection/transmission paradigm of such a GSM/GPS device to be delayed if the current position indicates that data transmission is likely to be poor. This enables data transmission costs to be eliminated when successful data transmission is not likely to occur. Data is stored until the vehicle moves to a location with better reception. It should be recognized that the same concepts can be applied where some other cell phone technology is employed, or where satellite data transmission is used in place of or in addition to cell phone data transmission.

In at least some embodiments where position data is part of the vehicle data, the data link, GPS component, and processor are integrated into a single device (which can be implemented by one or more of a smart phone, a mobile computing device, a mobile telematics device, and a telematics device more or less permanently installed in the vehicle). The processor at the vehicle implements functions generally consistent with the method discussed above, in which the data transmission is delayed when the vehicle is currently at a location with poor connectivity to a wireless data link (such as cell phones or satellites). In general, the remote computing device can be implemented by a computing system employed by an entity operating a fleet of vehicles, as well as a website operated by a third party. Entities that operate vehicle fleets can thus use such computing systems/websites to track and process data relating to their vehicle fleet. It should be recognized that these basic elements can be combined in many different configurations to achieve the exemplary method discussed above. Thus, the details provided herein are intended to be exemplary, and not limiting on the scope of the concepts disclosed herein.

The concepts disclosed herein can be used to collect many different permutations and combinations of vehicle data. Exemplary data types that can be collected include an amount of fuel passing through fuel injectors, other fuel use metrics, throttle position data, engine, oil, coolant and/or brake temperatures data, accessory device use (and any parasitic load associated with such use), cruise control use data, transmission gear data, engine load data, inclinometers data, accelerometer data, hard braking data, engine RPM data.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 8:
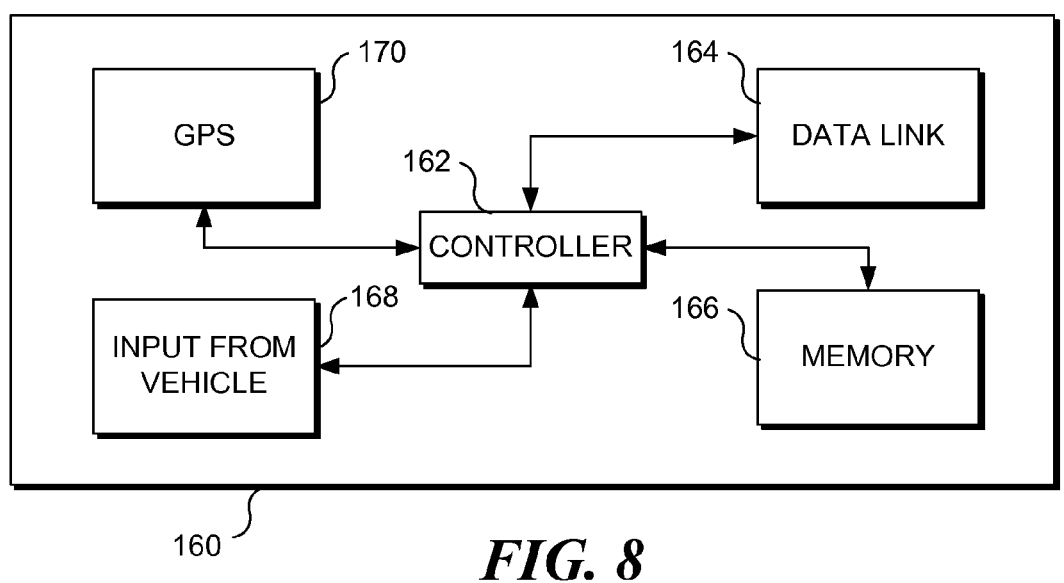
Figure 4:
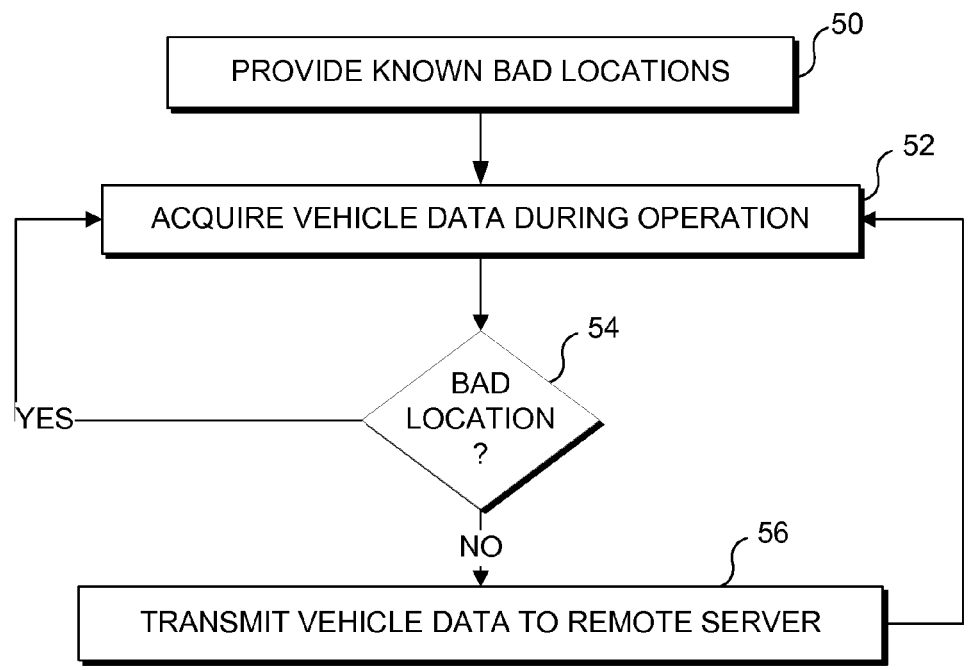
FIG. 4 is a flow chart showing exemplary method steps implemented in a first exemplary method wherein transmission of vehicle data to a remote server is delayed if the vehicle location corresponds to a known bad location.
Figure 6:
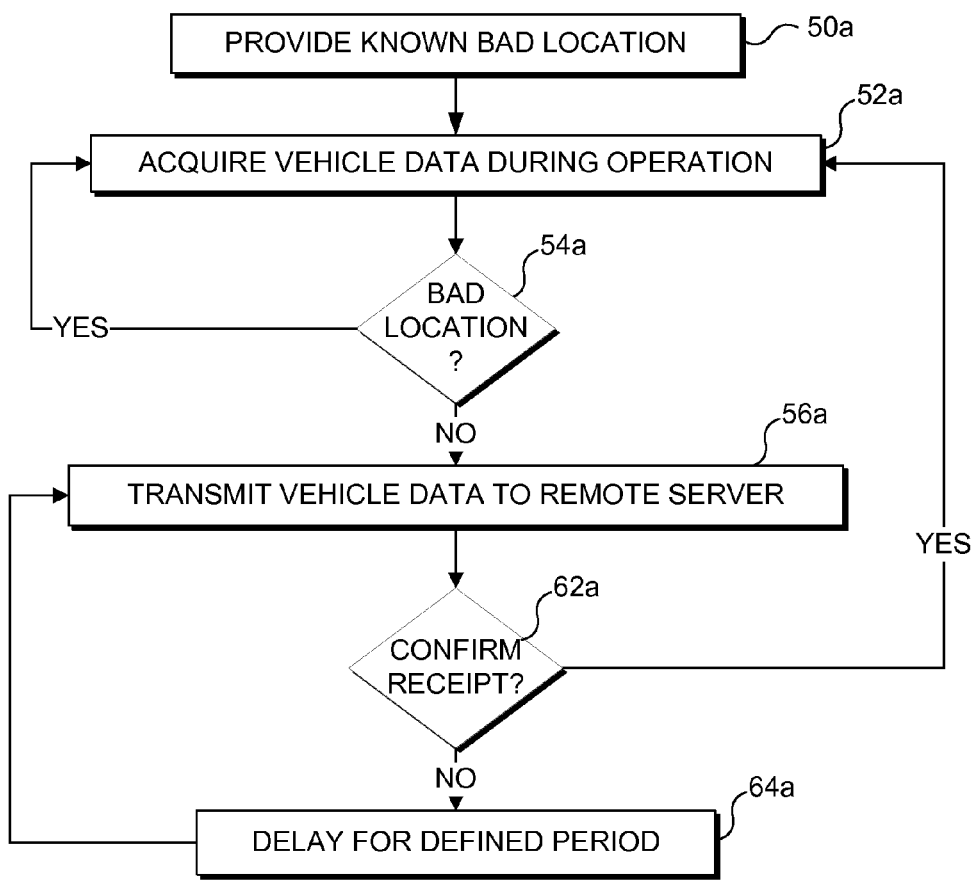
FIG. 6 is a flow chart showing exemplary method steps implemented in a third exemplary method combining elements of the first and second exemplary methods of FIGS. 4 and 5, respectively.
Figure 7:
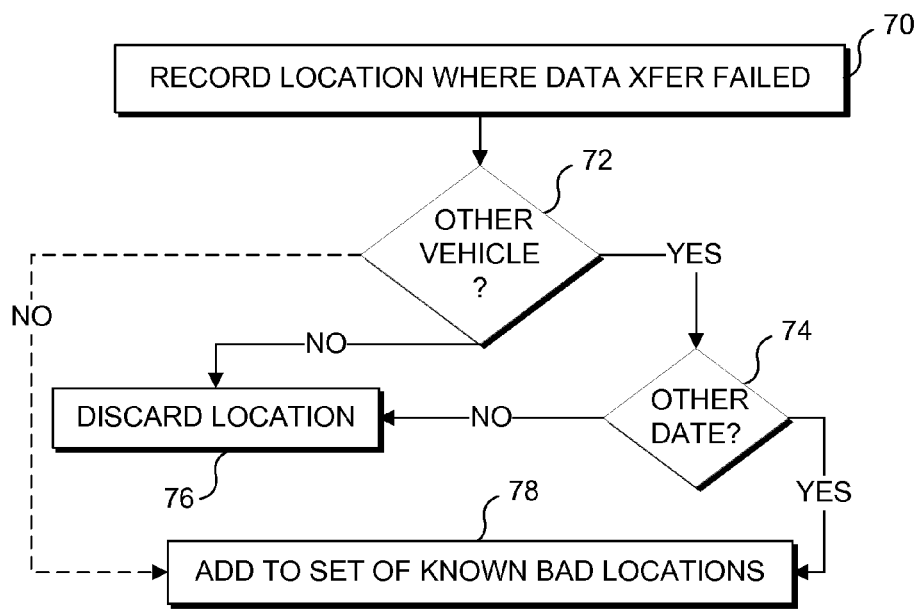

FIG. 7 is a flow chart showing exemplary method steps implemented in a fourth third exemplary method which is used to generate a set of know bad locations, to be used in the first and third exemplary methods of FIGS. 4 and 6, respectively; and FIG. 8 is a functional block diagram of an exemplary telematics device added to an enrolled vehicle to implement one or more of the methods of disclosed herein (i.e., to change a data transmission rate based on a quality of a data link).

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. Further, it should be understood that any feature of one embodiment disclosed herein can be combined with one or more features of any other embodiment that is disclosed, unless otherwise indicated.

As used herein and in the claims that follow, the terms processor and controller have been used interchangeably with respect to describing an element to implement a specific logical function, and applicant intends the terms to be interpreted broadly, as encompassing elements that implement specifically defined logical functions (which in some cases rely on machine instructions stored in a memory to implement the function). Even where the term processor is used in place of the term controller, applicant believes that the artisan of skill would be able to readily determine from the disclosure provide herein what additional elements, such as peripherals (ports, clock, timers, UARTs, and ADC) and memory (including, but not limited to EEPROM, SRAM, EPROM, and flash) will be used in connection with such a processor to implement the described logical function.

Types of Vehicle Data

In some embodiments, the vehicle data includes GPS data, but it should be understood that the concepts disclosed herein can be applied to embodiments in which other types of vehicle data are collected, in addition to or instead of position data. Exemplary types of vehicle data include, but are not limited to, position data, vehicle speed data, braking data, engine parameter data (such as coolant temperature, oil temperature and pressure, fuel flow, load, RPMs, etc.), transmission parameter data, tire pressure data, tire temperature data, time, ambient temperature data, ambient pressure data, altitude data, and/or data from accelerometers and/or other sensors. In some embodiments, the vehicle data is collected from a vehicle ECU or data bus, while in other embodiments some vehicle data is collected from dedicated aftermarket sensors added to the vehicle.

Acquisition of Vehicle Data

The vehicle data can be acquired from tapping into the vehicle data bus via an existing port, or by splicing into the vehicle data bus using generally accepted industry practices. Tapping into a vehicle data bus will allow vehicle data generated by original manufacturer installed sensors, controllers and hardware to be acquired by the vehicle data logger. The data logger can be logically coupled to aftermarket sensors (exemplary, but not limiting types of sensors include temperature sensors, inclinometers, accelerometers, pressure sensors, position sensors) and/or or hardware (exemplary, but not limiting types of hardware include emergency lights, emergency sirens, emergency data links, an operator panic button, lifts, buckets, and arms).

Export of Vehicle Data

The vehicle data can be exported from the vehicle to a remote computing device (or computer network) in multiple ways. In some embodiments, the vehicle data is exported in real-time using a relatively long range wireless data link. The term relatively long range wireless data link encompasses satellite and cellular data transmission. In at least one such embodiment, data is transmitted from the vehicle to a remote computing device using the relatively long range wireless data link during normal vehicle operation. Many different data transmission paradigms can be employed, such as transmitting data at predetermined intervals, transmitting data based on the occurrence of predetermined events, and transmitting data once a certain quantity of data has been collected, including permutations and combinations thereof. Vehicle data can be temporarily stored at the vehicle when the relatively long range wireless data link is unavailable.

In some embodiments, the vehicle data is stored at the vehicle and then exported using a relatively short range wireless data link. The term relatively short range wireless data link encompasses short range radio (such as 900 MHz), Wi-Fi, and IR data transmission. Such relatively short range wireless data links can be employed when a vehicle returns to a fleet storage yard at the end of a day. Such relatively short range wireless data links can also be deployed at a plurality of different locations, so that a vehicle visiting such a location can export stored vehicle data. For example, a fleet operator having a number of facilities (such as a retail store chain having a plurality of stores and/or warehouses) might deploy such short range wireless data links at each of their facilities, such that vehicle data collected by each of the fleet vehicles is exported whenever that vehicle is in range of a company facility. Each facility would include a wireless access point or node, which is used to extract data from the company's fleet vehicles. Once extracted, the data can be sent over a network to a company operated server for archive and analysis (or the data can be conveyed to a third party for archive and analysis). Companies servicing fleet vehicles, such as truck stops, weigh stations, inspection stations, repair stations and/or fueling stations, can deploy such short range wireless data links (i.e., nodes or wireless access points) at each of their facilities, and offer data retrieval and forwarding services to their fleet customers as an additional service (for a fee or for free as an enhancement to their existing service offerings). The amount of data collected, and the size of the memory at the vehicle dedicated to storage of such vehicle data, will determine how frequently such data needs to be exported. Applicants' experience with collecting and exporting vehicle has indicated that very useful data sets can be stored using readily obtainable data storage devices. For example, where data will be exported regularly (at least weekly), 128 MB to 256 MB flash memory can be used. Vehicle data can be accumulated over longer periods of time using larger memory, which is readily available as flash memory in standard sizes up to 32 GB, with even larger sizes becoming available over time. Data logging logic can be implemented where older data is overwritten first in circumstances where data export is delayed and all memory resources have been consumed. Of course, the quantity of vehicle data being collected will impact the amount of storage required.

In some embodiments, drivers or service personnel will be tasked with regularly exporting the vehicle data to a portable computing device (or a portable memory), so the data can be transferred to a company server/computing device, or a data storage facility hosted by a third party. Such data export from the vehicle can be based on a short range wireless data link, a hard wire data link (requiring the collection device to be coupled to a physical data port at the vehicle), and/or by removing a portable memory module from the vehicle (such as a flash memory module). In at least some embodiments, the vehicle data is extracted using a smart phone or tablet computing device.

Exemplary Data Logger with Computing Environment

Figure 1:
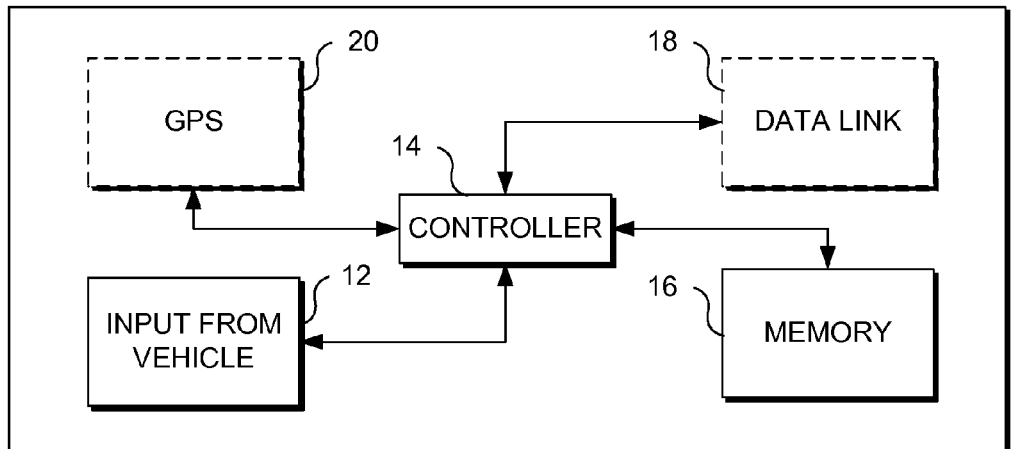
FIG. 1 is a functional block diagram of an exemplary data logger to be used in a vehicle to implement the concepts disclosed herein.

FIG. 1 is a functional block diagram of an exemplary data logger. It should be understood that the basic data logger elements can be configured in many different ways, thus the data logger of FIG. 1 is intended to be exemplary, and not limiting. The basic elements of a data logger 10 in accord with the concepts disclosed herein include at least one data input element 12 that acquires vehicle data, a controller 14 (or processor and additional elements required to enable the processor to implement the required function) that implements a predefined data logging paradigm (and which changes that data logging paradigm in response to an emergency event, generally as disclosed herein and the claims that follow), and a memory 16 in which the logged vehicle data can be stored prior to export. In some embodiments, memory 16 is removable, such that the data can be exported by physically removing the memory. In other embodiments, a data link 18 is provided to facilitate export of the vehicle data. The data link can be a data port to export vehicle data via a hard wire connections, a relatively short range wireless data link (such as short range radio, Wi-Fi, Bluetooth, and/or IR), and/or a relatively long range wireless data link (such as cellular or satellite based).

Significantly, controller 14 implements at least two logical functions. A first logical function is to log (the term log is intended to encompass storing data locally at the vehicle or transmitting data immediately after acquisition to a memory remote from the vehicle) vehicle data according to a predefined data logging paradigm. The concepts disclosed herein can be applied may different types of predefined data logging paradigms. A first a predefined data logging paradigm is based on acquiring vehicle data according to a specific time interval (such as once every minute, one every 5 minutes, once every hour; such time intervals being exemplary). At each time interval, an identical set of vehicle data can be acquired, or the set of vehicle data can be varied at each subsequent interval (such a strategy can be helpful when the amount of vehicle data available is larger than the amount of resources allocated for storage/transmission of the data, in that different types of data can be acquired at different times, thereby increasing a diversity in the data by reducing a density of each different type of data). Certain types of vehicle data (such as position data, for embodiments where position is part of the vehicle data being logged) can be collected at each data logging event, even when other types of data being logged are varied.

A second predefined data logging paradigm is based on acquiring vehicle data based on specific sensor thresholds, such that certain types of vehicle data are logged when a specific threshold value is met. For example, a vehicle might be equipped with one or more of the following sensors: a door sensor, a speed sensor, a cruise control sensor (i.e., an element that can determine whether a cruise control unit is on or off), an engine temperature sensor, tire pressure sensors, brake temperature sensors, an oil temperature sensor, a coolant temperature sensor, an oil pressure sensor, a fault code sensor, and an accessory sensor for accessory equipment such as fans (i.e., an element that can determine whether a specific accessory device is on or off). Note that such sensors are intended to be exemplary, and not limiting. The second predefined data logging paradigm will cause vehicle data to be logged when a defined threshold for a defined sensor is met. For example, the second predefined data logging paradigm can be configured to log vehicle data when a door sensor indicates that a door has been opened. The second predefined data logging paradigm can be configured to log vehicle data when a coolant temperature sensor detects temperatures in excess of 190 degrees F. (noting that such a threshold value is exemplary, and not limiting). Thus, in the second predefined data logging paradigm the vehicle data is logged based not on time, but on events. It should be understood that the first and second predefined data logging paradigms could be combined, so that some vehicle data is logged according to time, while other vehicle data is logged based on an event.

Yet another predefined data logging paradigm (the third predefined data logging paradigm) is based on intelligent logging, which is particularly applicable in embodiments where location data is part of the vehicle data being logged. Intelligent logging delivers fleet management users extremely high fidelity data renderings of vehicle operations in the most cost efficient manner possible. Marked by low data overhead (including transmission and storage) when compared with competing offerings, intelligent logging provides a very efficient data logging paradigm. Instead of collecting GPS location data based on time (the first predefined data logging paradigm discussed above), intelligent logging is a logical method to determine when and where data points should be logged. Although there is a time component to the decision process, intelligent logging primarily uses speed and direction changes to determine when a vehicle location requires logging. Data points are collected whenever starting and stopping a vehicle, as well as whenever speed and direction change. Location and event based collection ensures that relevant data is collected while avoiding unneeded data "overhead". Logged data can be batch processed at the vehicle to reduce data transmission costs associated with cellular or satellite data transmission.

It should be understood that the above described predefined data logging paradigms are intended to be exemplary, as the concepts disclosed herein can be implemented with other predefined data logging paradigms as well. Regardless of what predefined data logging paradigm is implemented during normal vehicle operation (the first function implemented by controller 14), the concepts disclosed herein encompass changing the predefined data logging paradigm (or default data logging paradigm) based on detecting an emergency. The premise is that whatever logic was employed to define a data logging paradigm for normal vehicle operation, having a denser, richer set of vehicle data during an emergency event might have value. Thus, a second function implemented by controller 14 is to increase the data logging (i.e., the sampling rate) during an emergency event. Techniques for determining whether or not an emergency event exists are discussed below.

Referring to the data logger of FIG. 1, it should be recognized that an exemplary data input element will tap into an existing vehicle data bus, which will allow the data logger to acquire vehicle data generated by original manufacturer installed sensors, controllers and hardware. One or more data input elements can be logically coupled to aftermarket sensors (such as temperature sensors, inclinometers, accelerometers, pressure sensors, and/or position sensors). One or more data input elements can be configured to determine the state (such as on or off) of various vehicle hardware elements (such as emergency lights, emergency sirens, emergency data links, an operator panic button, lifts, buckets, and arms).

Exemplary data loggers (each of which include a GPS elements and a cellular data link), consistent with FIG. 1, are available from Zonar Systems of Seattle, Wash., marketed under the names V2J™, WOMBAT™, VTECU™, and V3™. Note earlier versions of such products had similar hardware, but the controller did not implement the specific functions disclosed herein.

Note that in many embodiments, memory 16 will not be removable and a data link will be used to export logged vehicle data. However, the concepts disclosed herein encompass using portable memory modules (such as flash memory devices) so that data can be exported by physically removing a memory module from the vehicle environment. The relative size of the memory will be based on how much data will be accumulated before export intervals. In general, the more frequent the export, the smaller the memory needs to be, while the larger the quantity of data being logged, the larger the memory needs to be.

The data logger is configured to change the data logging paradigm in response to detecting the activation of emergency equipment, such as lights and/or sirens. Those basic elements can be configured in many different ways. For example, the data logger can be a single integrated device, or the basic elements can be distributed among a plurality of different vehicle components or locations. In some embodiments, the memory is used to store other data in addition to the vehicle data disclosed herein (including but not limited to vehicle inspection data, driver hours of service data, and/or navigation data). In some embodiments, the controller implements functions in addition to data logging. In at least one embodiment, the controller is part of a mobile computing device, such as a smart phone or tablet. In at least one embodiment, the controller is hardwired into the vehicle, and implements additional functions during vehicle operations (such as a vehicle ECU). In at least one embodiment, the controller is part of a telematics device that includes a GPS component. In still another embodiment, the controller is part of a cable device that is configured to tap into and extract vehicle data from an existing vehicle data bus. In an exemplary such cable device, a short range wireless data link included in the cable device enables vehicle data to be exported from the cable device.

Figure 2:
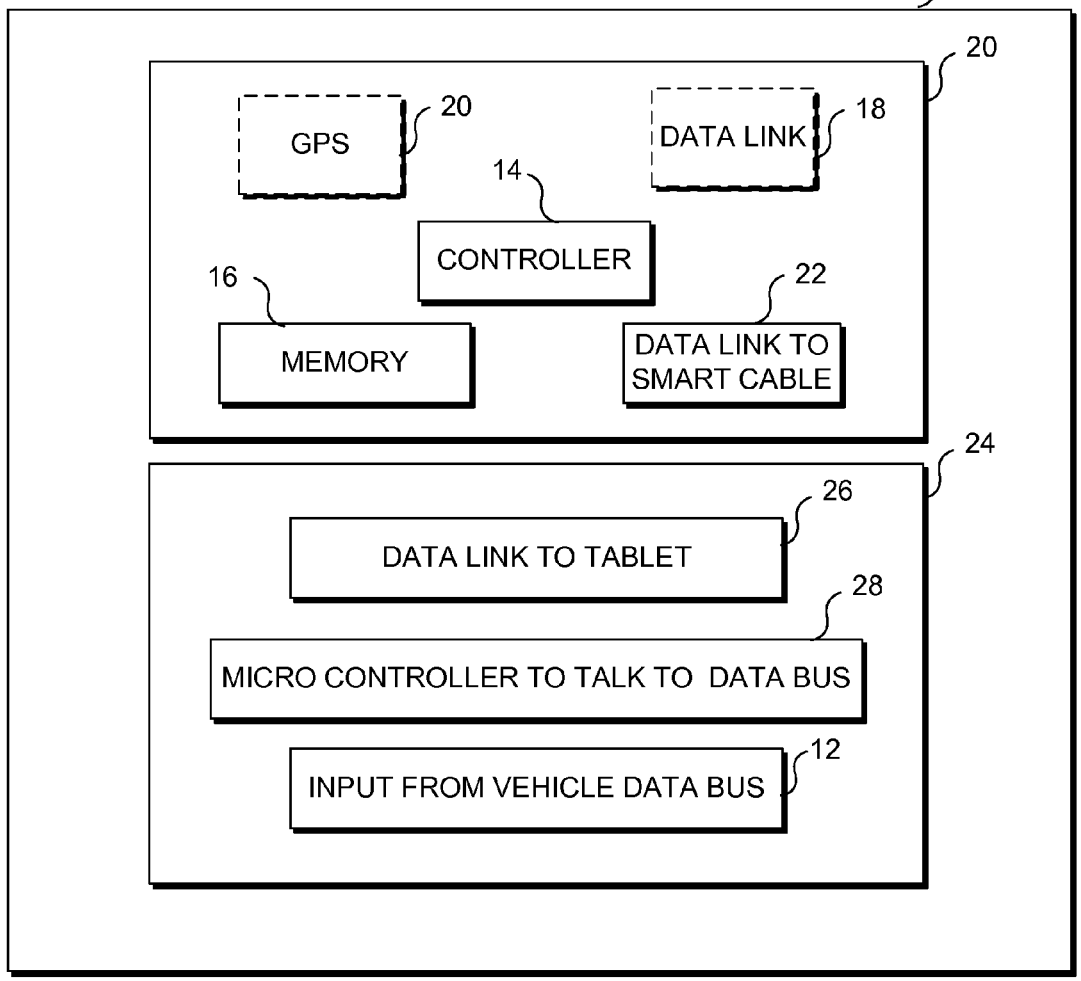
FIG. 2 is a functional block diagram of an exemplary data logger to be used in a vehicle to implement the concepts disclosed herein, which includes a smart cable to access a vehicle data bus, the smart cable being capable of being used in connections with many other concepts, some of which are disclosed herein.

FIG. 2 schematically illustrates an alternative data logger 10a, which includes a logger component 20 and a smart cable 24. Logger component 20 is very similar to logger 10, but lacks a data link to the vehicle data bus. Smart cable 24 performs that function. Smart cable 24, also referred to as a JBus cable, performs the function of enabling a data logger (or a GPS unit, or a mobile computing device, or a smart phone, or a telematics device) to establish a logical communication with a vehicle data bus, to enable extraction of data resident or available on the vehicle data bus (or from a vehicle ECU). Smart cable 24 includes a data link 26 to a tablet (or other mobile computing device, including but not limited to logger 20, a smart phone, a GPs unit, a telematics device), a micro controller 28 configured to logically communicate to a vehicle ECU or vehicle data bus, and a connector/input configured to physically connect to a vehicle databus or vehicle ECU.

In at least some embodiment, smart cable 24 includes a wireless data link component (such as Wi-Fi, Bluetooth, or RF), that enables the smart cable to export data from a vehicle data bus/vehicle ECU to a mobile computing device. It should be understood that the potential uses of smart cable 24 extend well beyond the emergency data logging concepts emphasized herein.

In one related embodiment, smart cable 24 is used to enable smart phone uses to extract vehicle fault code data to their smart phones. In at least one embodiment, a party selling the smart cable charges a fee for each use of the smart cable to access data from the vehicle data bus. Besides fault code data, other data include, but are not limited to, throttle position data, fuel use data, and all other data available via the vehicle data bus/ECU.

In another related embodiment, smart cable 24 is used in connection with a fuel authorization system, such as disclosed in commonly owned patent titled METHOD AND APPARATUS FOR FUEL ISLAND AUTHORIZATION FOR THE TRUCKING INDUSTRY, Ser. No. 12/906,615, the disclosure and drawings of which are hereby specifically incorporated by reference. In such an embodiment, smart cable 24 is used to extract a VIN or ZID that is used in the fuel authorization process, generally as described in the reference patent.

Figure 3:
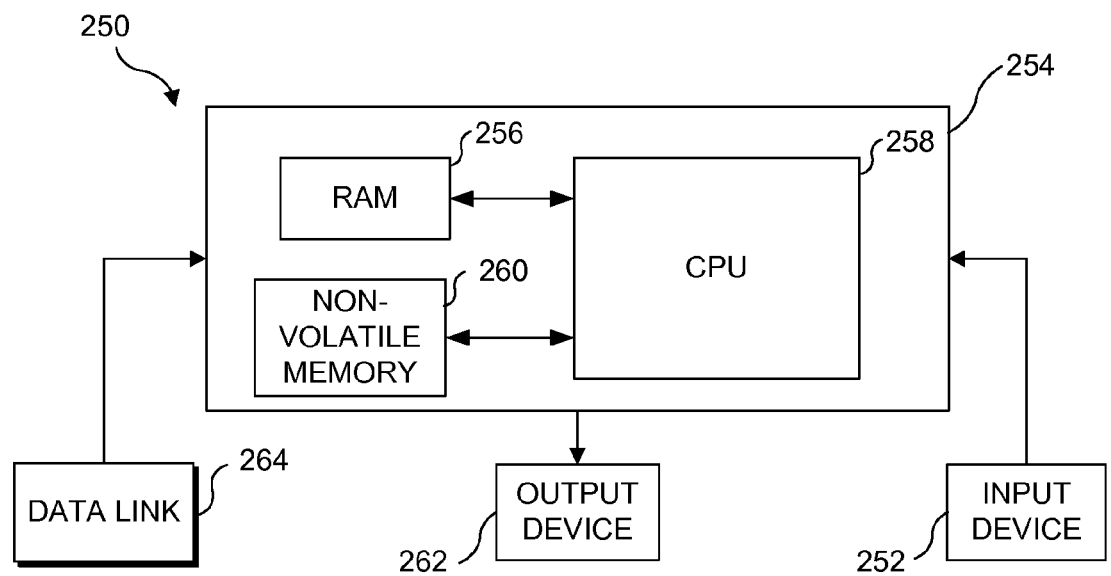
FIG. 3 is a functional block diagram of an exemplary computing device that can be employed to vehicle data collected as described herein.

In general, analysis of the vehicle data will be carried out by a remote computing device. The remote computing device in at least one embodiment comprises a computing system controlled or accessed by the fleet operator. The remote computing device can be operating in a networked environment, and in some cases, may be operated by a third party under contract with the fleet operator to perform such services. FIG. 3 schematically illustrates an exemplary computing system 250 suitable for analyzing vehicle data, including position data. Exemplary computing system 250 includes a processing unit 254 that is functionally coupled to an input device 252 and to an output device 262, e.g., a display (which can be used to output a result to a user, although such a result can also be stored). Processing unit 254 comprises, for example, a central processing unit (CPU) 258 that executes machine instructions for carrying out an analysis of vehicle data collected in connection with operation of the vehicle to determine at least one operating characteristic of the vehicle. CPUs suitable for this purpose are available, for example, from Intel Corporation, AMD Corporation, Motorola Corporation, and other sources, as will be well known to those of ordinary skill in this art.

Also included in processing unit 254 are a random access memory (RAM) 256 and non-volatile memory 260, which can include read only memory (ROM) and may include some form of memory storage, such as a hard drive, optical disk (and drive), etc. These memory devices are bi-directionally coupled to CPU 258. Such storage devices are well known in the art. Machine instructions and data are temporarily loaded into RAM 256 from non-volatile memory 260. Also stored in the non-volatile memory are an operating system software and ancillary software. While not separately shown, it will be understood that a generally conventional power supply will be included to provide electrical power at voltage and current levels appropriate to energize computing system 250.

Input device 252 can be any device or mechanism that facilitates user input into the operating environment, including, but not limited to, one or more of a mouse or other pointing device, a keyboard, a microphone, a modem, or other input device. In general, the input device will be used to initially configure computing system 250, to achieve the desired processing (i.e., to compare subsequently collected actual route data with optimal route data, to identify any deviations and/or efficiency improvements). Configuration of computing system 250 to achieve the desired processing includes the steps of loading appropriate processing software into non-volatile memory 260, and launching the processing application (e.g., loading the processing software into RAM 256 for execution by the CPU) so that the processing application is ready for use. Output device 262 generally includes any device that produces output information, but will most typically comprise a monitor or computer display designed for human visual perception of output. Use of a conventional computer keyboard for input device 252 and a computer display for output device 262 should be considered as exemplary, rather than as limiting on the scope of this system. Data link 264 is configured to enable data collected in connection with operation of a vehicle to be input into computing system 250 for subsequent analysis. Those of ordinary skill in the art will readily recognize that many types of data links can be implemented, including, but not limited to, universal serial bus (USB) ports, parallel ports, serial ports, inputs configured to couple with portable memory storage devices, FireWire ports, infrared data ports, wireless data communication such as Wi-Fi and Bluetooth™, network connections via Ethernet ports, and other connections that employ the Internet.

It should be understood that the term remote computer and the term remote computing device are intended to encompass networked computers, including servers and clients, in private networks or as part of the Internet. The vehicle data can be stored by one element in such a network, retrieved for review by another element in the network, and analyzed by yet another element in the network. In at least one embodiment, a vendor is responsible for storing the data, and clients of the vendor are able to access and manipulate the data. While implementation of the method noted above has been discussed in terms of execution of machine instructions by a processor (i.e., the computing device implementing machine instructions to implement the specific functions noted above), the method could also be implemented using a custom circuit (such as an application specific integrated circuit).

Delaying Vehicle Data Transmission at Locations with Poor Connectivity

As discussed above an aspect of the concepts disclosed herein relates to reducing data transfer rates when a quality of the cellular or satellite link is poor. Wireless data links generally are designed to be able to determine when a wireless data link is available, such that data is transmitted only when a wireless data link is available, and if the wireless data link is unavailable not data transmission is attempted (the data is stored for later transmission, a technique referred to as store forward). However, there are occasions when a wireless data link is available, but is of such poor quality, that data packets are lost in transmission. Consider a telematics system including data collection components at a vehicle (which can include one or more of a GPS sensor and other vehicle performance data sensors, including a data link coupling a vehicle telematics unit to a vehicle data bus and/or vehicle controller, such as an ECU), a wireless data link (such as a cellular or satellite data link), and a remote computing device for archiving and analyzing data collected from the vehicle. In such a system, when a data packet is conveyed from the vehicle to the remote computing device, the remote computing device can use the wireless data link to send a confirmation to the vehicle that the data packet transmission was successful. Such confirmations can be very compact (perhaps a hash of the data packet that was sent), such that the relative cost of transmission of the confirmation is relatively low. When a controller at the vehicle responsible for the data transmission fails to receive such a confirmation (generally such a controller is part of a vehicle telematics unit, although it should be understood that some other controller at the vehicle can be assigned this task), the data packet can be resent. When the wireless data link is available, but of relatively poor quality, packets can be transmitted multiple times before being successfully received, increasing the amount of airtime (or satellite) time being consumed, driving up costs (airtime/satellite time is often billed per byte or megabyte of data transferred, and failed transmissions are still billed).

The concepts disclosed herein address this issue of reducing unsuccessful data transmissions by changing the logic in the controller at the vehicle managing the data transmission. In one embodiment, if two data packets are not successfully transmitted (i.e., confirmations from the remote server/computing device are not received at the vehicle for the transmitted packets) within a first predetermined period of time, a time out (corresponding to a second predetermined period of time) for subsequent data transmissions is imposed. In an exemplary embodiment, the first predetermined period of time period is five minutes, and the second predetermined period of time is ten minutes, although such time periods are exemplary and not limiting. It should be understood that the first and second predetermined periods of time can be equal in length, or different in length. In some embodiments, the first predetermined period of time is longer than the second predetermined period of time. In other embodiments, the first predetermined period of time is shorter than the second predetermined period of time. It should also be understood that the number of failed transmissions that are required to trigger such a time amount can be modified as desired; thus the two failed transmissions discussed in this paragraph is intended to be exemplary, and not limiting. The time out can be imposed based on a single failed transmission, or more than two failed transmissions.

In a related embodiment, one or more of the first and second predetermined periods of time can be modified by the controller managing the data transmission. For example, the first predetermined period of time can initially be relatively short, and if the problem of failed data transmissions continues, the duration of the first predetermined period of time can be increased, to further reduce costs associated with failed data transmissions. The duration of the second predetermined period of time can be similarly modified. The durations of the first and second predetermined periods of time can be extended together, or independently of each other. Similarly, the number of failed attempts before a time out is triggered can also be modified. For example, the number of failed attempts can start out at a first value, and that value can be reduced as the problem of failed transmissions continues.

In a related embodiment, the telematics system (which includes a plurality of vehicles having data collection components (including a GPS or position sensing component), and a remote computing device or server where the data is stored and/or analyzed), learns over time the locations associated with failed data transmissions. Each time a vehicle fails to receive a confirmation that a data packet was transmitted successfully, a location associated with the failed transmission is recorded in a memory at the vehicle. When successful connection with the remote computing device is available, that location data is communicated to the remote computing device, which generates a record of locations associated with data transmission failures. Over time, a map of locations where data transmission failures occur will be developed. Those locations can be provided to the data transmission controller at the participating vehicles, so that data transmission is not attempted in those locations. Recognizing that some data transmission failures are random, and not indicative that there is an ongoing problem with data link quality at the location, such a database of locations can give more weight to locations associated with multiple data transmission failures. In one embodiment, a location is not defined as a do not attempt to transmit data from here location until more than one data transmission failures are associated with that location. It should be understood that the number of times a failed transmission need to occur at a particular location before being added to a set of locations defined as a do not attempt to transmit data location from here can be adjusted to suit user preference. As the set of locations defined as a do not attempt to transmit data from here changes over time, that set (or additions/deletions from that set) can be sent from the remote computing device to each enrolled vehicle using the wireless data link. Such updating can be part of an existing firmware update schedule, or a dedicated update.

With respect to the set of locations defined as a do not attempt to transmit data from here, it should be understood that a correction factor can be applied to expand the area from which data transmission will not be attempted. For example, assume location A is defined as a location from which a data transmission should not be attempted. An expansion factor can be applied to that location, such that data transmission will not be attempted when a vehicle is within some predefined distance of that location. For example, the controller or processor at the vehicle tasked with controlling transmission of data packets can be configured to hold for later transmission any data packet normal operations would cause to be transmitted when the vehicle is within 1 kilometer of a location defined as a do not attempt to transmit data from here. It should be understood that 1 kilometer is exemplary, and other distances can also be selected. Whatever distance is selected should take into account the GPS margin of error, such that the selected expansion factor is larger than the margin of error.

FIG. 4 is a flow chart showing exemplary method steps implemented in a first exemplary method wherein transmission of vehicle data to a remote server is delayed if the vehicle location corresponds to a known bad location. In a block 50 known bad locations are provided. This step can be implemented by a storing one or more known bad locations in a non-transitory memory at the vehicle that can be accessible by a processor or controller responsible for sending vehicle data from the vehicle to a remote server over a wireless data link (such as a cellular link or a satellite link). In a block 52 vehicle data is collected during vehicle operation. Vehicle data can include one or more of location data, fuel data use, brake temperature data, oil temperature data, coolant temperature data, throttle position data, engine load data, engine RPM data, shift position/gear selected data, cruise control status data, and/or accessory device status data.

In a decision block 54, the current vehicle location is compared to known bad locations. If the current vehicle position corresponds to a known bad location, no data transmission is attempted. The logic moves to block 52 and additional vehicle data is collected. If the current vehicle position does not correspond to a known bad location, then the vehicle data is transmitted over the wireless data link to a remote server in a block 56. In general, after block 56 the logic will loop back to block 52, and more data is collected.

In general, the steps of blocks 52, 54, and 56 are implemented by one or more processors at the vehicle. Such processors can be part of the exemplary telematics device of FIG. 8.

Figure 5:
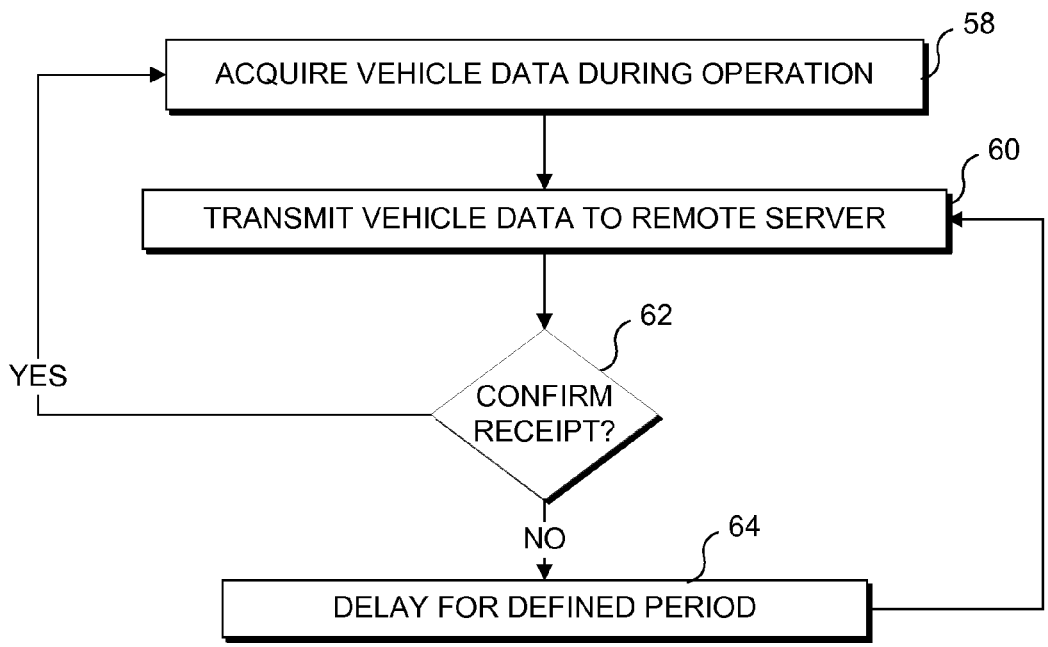
FIG. 5 is a flow chart showing exemplary method steps implemented in a second exemplary method wherein transmission of vehicle data to a remote server is delayed if a confirmation receipt from the remote server is not received at the vehicle.

FIG. 5 is a flow chart showing exemplary method steps implemented in a second exemplary method wherein transmission of vehicle data to a remote server is delayed if a confirmation receipt from the remote server is not received at the vehicle. In a block 58 vehicle data is collected during vehicle operation. Again, vehicle data can include one or more of location data, fuel data use, brake temperature data, oil temperature data, coolant temperature data, throttle position data, engine load data, engine RPM data, shift position/gear selected data, cruise control status data, and/or accessory device status data. In a block 60 the vehicle data is transmitted over the wireless data link (cellular or satellite being exemplary types of wireless data links) to a remote server. In a decision block 62a determination is made as to whether the remote server has sent a confirmation receipt to the vehicle. If so, then the logic loops back to block 58 and additional vehicle data is collected. If no confirmation receipt has been received, then in a block 64 data transmissions from the vehicle to the remote server are delayed for a predefined period of time, to allow the vehicle to move to an area with better connectivity. Exemplary but not limiting time periods are 5 minutes, 10 minutes, 15 minutes, 30 minutes, 45 minutes, and 60 minutes.

In general, the steps of blocks 58, 60, 62, and 64 are implemented by one or more processors at the vehicle. Such processors can be part of the exemplary telematics device of FIG. 8.

FIG. 6 is a flow chart showing exemplary method steps implemented in a third exemplary method combining elements of the first and second exemplary methods of FIGS. 4 and 5, respectively. In a block 50a known bad locations are provided. In a block 52a vehicle data is collected during vehicle operation. In a decision block 54a, the current vehicle location is compared to known bad locations. If the current vehicle position corresponds to a known bad location, no data transmission is attempted. The logic moves to block 52a and additional vehicle data is collected. If the current vehicle position does not correspond to a known bad location, then the vehicle data is transmitted over the wireless data link to a remote server in a block 56a. In a decision block 62a a determination is made as to whether the remote server has sent a confirmation receipt to the vehicle. If so, then the logic loops back to block 52a and additional vehicle data is collected. If no confirmation receipt has been received, then in a block 64a data transmissions from the vehicle to the remote server are delayed for a predefined period of time, to allow the vehicle to move to an area with better connectivity.

In general, the steps of blocks 52a, 54a, 56a, 62a, and 64a are implemented by one or more processors at the vehicle. Such processors can be part of the exemplary telematics device of FIG. 8.

FIG. 7 is a flow chart showing exemplary method steps implemented in a fourth third exemplary method which is used to generate a set of know bad locations, to be used in the first and third exemplary methods of FIGS. 4 and 6, respectively. In a block 70 a record is made of each location where data transmission from a vehicle failed. The method of FIG. 5 can be used to determine locations where such failures occur. The record can be made at the vehicle as part of the vehicle data being collected, and then sent to a remote server for analysis. The remote server can process vehicle data received form many vehicles, and then process each location corresponding to a failed transmission to determine if that location should be defined as a known bad location. The known bad location set then can be used in the methods of FIGS. 4 and 6

In a decision block 72, a determination is made as to whether a specific location corresponding to a failed data transmission is a location that has also been reported by a different vehicle as being associated with a failed transmission. In a first exemplary embodiment, even if the specific location being analyzed has not been reported by another vehicle, the logic moves to a block 78 and that location is added to a set of known bad locations. Note the line between decision block 72 and block 78 is a dashed line, indicating that this logic is an optional embodiment. In this optional embodiment, relatively more locations will be added to the set of known bad locations, because all that is required to be added to the set of known bad locations is for a specific location to have been reported once. In a second exemplary embodiment, if the specific location being analyzed has not been reported by another vehicle, the logic moves to a block 76 and that location is discarded. In this second, preferred embodiment, relatively fewer locations will be added to the set of known bad locations, because a location must have been both reported by a different vehicle, and reported on a different date to be added to the set of known bad locations.

Referring once again to decision block 72, if it is determined that the specific location has been reported by other vehicles as well, then the logic moves to a decision block 74, and a determination is made as to whether the specific location being analyzed has been reported as corresponding to a failed data transmission on a different date. If the determination is no, then the logic moves to block 78 and that specific location is discarded. However, if the determination is yes (that specific location was associated with a failed transmission on a different date), then the logic moves to block 78 and that location is added to the set of known bad locations.

It should be understood that various combinations and permutations of specific locations being associated with failed data transmissions as reported on different dates and by different vehicles are possible. In one embodiment, no location will be added to the set of known bad locations unless that location was reporting by more than one vehicle on more than one date. In one embodiment, a location will be added to the set of known bad locations if it is reported by one vehicle on more than one date. In one embodiment, a location will be added to the set of known bad locations if it is reported by two vehicles even on the same date.

Non-Transitory Memory Medium

Many of the concepts disclosed herein are implemented using a processor that executes a sequence of logical steps using machine instructions stored on a physical or non-transitory memory medium. It should be understood that where the specification and claims of this document refer to a memory medium, that reference is intended to be directed to a non-transitory memory medium. Such sequences can also be implemented by physical logical electrical circuits specifically configured to implement those logical steps (such circuits encompass application specific integrated circuits).

Exemplary GPS Device with Onboard Computing Environment

FIG. 8 is a functional block diagram of an exemplary telematics device added to an enrolled vehicle to implement one or more of the methods of disclosed herein (i.e., to change or delay a data transmission rate based on a quality of a data link).

An exemplary telematics unit 160 includes a controller 162, a wireless data link component 164, a memory 166 in which data and machine instructions used by controller 162 are stored (again, it will be understood that a hardware rather than software-based controller can be implemented, if desired), a position sensing component 170 (such as a GPS receiver), and a data input component 168 configured to extract vehicle data from the vehicle's data bus and/or the vehicle's onboard controller (noting that the single input is exemplary, and not limiting, as additional inputs can be added, and such inputs can be bi-directional to support data output as well).

The capabilities of telematics unit 160 are particularly useful to fleet operators. Telematics unit 160 is configured to collect position data from the vehicle (to enable vehicle owners to track the current location of their vehicles, and where they have been) and to collect vehicle operational data (including but not limited to engine temperature, coolant temperature, engine speed, vehicle speed, brake use, idle time, and fault codes), and to use data link 164 to (wirelessly in an exemplary but not limiting embodiment) convey such data to vehicle owners. These data transmission can occur at regular intervals, in response to a request for data, or in real-time, or be initiated based on parameters related to the vehicle's speed and/or change in location, and/or the change in logging parameters discussed above. The term "real-time" as used herein is not intended to imply the data are transmitted instantaneously, since the data may instead be collected over a relatively short period of time (e.g., over a period of seconds or minutes), and transmitted to the remote computing device on an ongoing or intermittent basis, as opposed to storing the data at the vehicle for an extended period of time (hour or days), and transmitting an extended data set to the remote computing device after the data set has been collected. Data collected by telematics unit 160 can be conveyed to the vehicle owner using data link 164. If desired, additional memory can be included to temporarily store data when the data link cannot transfer data. In particularly preferred embodiments the data link is GSM or cellular technology based.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for reducing data transfer rates when a quality of the cellular or satellite link is known to be problematical, leading to an undesirable amount of failed data transmissions, the method comprising the steps of:
   (a) providing at least one known poor location for which data link quality is known to be problematical;
   (b) automatically collecting vehicle data from the vehicle during vehicle operation;
   (c) before transmitting the collected vehicle data to a remote computing site, automatically determining if a current position of the vehicle corresponds to a known poor location; and
   (d) if the current location corresponds a known poor location, then automatically storing the collected vehicle data for transmission from a different location, the different location not being a known poor location.

2. The method of claim 1, wherein if the step of automatically determining if the current position of the vehicle corresponds to a known poor location determines that the current location of the vehicle does not correspond to a known poor location, then further comprising the step of automatically determining if there is any stored vehicle data that was not transmitted because a prior location of the vehicle was a known poor location and collected vehicle data was stored rather than being transmitted, and if so, automatically transmitting the stored vehicle data.

3. The method of claim 1, wherein each known poor location comprises a specific coordinate defined by a latitude and longitude; and wherein the step of automatically determining if the current position of the vehicle corresponds a known poor location comprises the step of automatically applying an expansion factor so that if the current location of the vehicle is within an expanded distance of a known poor location, then automatically storing the collected vehicle data for transmission from a different location.

4. The method of claim 1, wherein the expansion factor is 1 kilometer.

5. The method of claim 1, wherein each known poor location comprises a specific coordinate defined by a latitude and longitude; and wherein the step of automatically determining if the current position of the vehicle corresponds to a known poor location comprises the steps of:
   (a) automatically applying an expansion factor to each known poor location; and
   (b) automatically determining if the current location of the vehicle, corresponds to an expanded known poor location, and if so, then automatically storing the collected vehicle data for transmission from a different location.

6. A non-transitory memory medium having machine instructions stored thereon, which when executed by a processor, carry out steps b, c, and d of claim 1.

7. The non-transitory memory medium of claim 6, wherein the machine instructions stored thereon, when executed by a processor, further carry out the steps of claim 3.

8. The non-transitory memory medium of claim 6, wherein the machine instructions stored thereon, when executed by a processor, further carry out the steps of claim 5.

9. A geographical position system for use in a vehicle, the geographical position system comprising:

(a) a positioning sensing component for collecting geographical position data from the vehicle during vehicle operation, the geographical position data being time indexed;
(b) a memory in which at least one known poor location associated with poor data link quality is stored;
(c) a wireless data link; and
(d) a processor for implementing the functions of:
  (i) automatically collecting vehicle data from the vehicle during vehicle operation;
  (ii) before transmitting the collected vehicle data to a remote computing site, automatically determining if a current position of the vehicle corresponds to a poor known location; and
  (iii) if the current location corresponds to a known poor location, then storing the collected vehicle data for transmission from a different location.

10. The geographical position system of claim 9, wherein the processor further implements the function of, after automatically determining that the current position of the vehicle does not corresponds to a known poor location, automatically determining if there is any stored vehicle data that was not transmitted because a prior location of the vehicle was a known poor location and vehicle data was stored rather than being transmitted, and if so, automatically transmitting the stored vehicle data.

11. The geographical position system of claim 9, wherein the processor further implements the functions of automatically applying an expansion factor so that if the current location of the vehicle is within an expanded distance of a known poor location, then automatically storing the collected vehicle data for transmission from a different location.

12. The geographical position system of claim 9, wherein the processor further implements the functions of:
  (a) automatically applying an expansion factor to each known poor location; and
  (b) automatically determining if the current location of the vehicle, corresponds to an expanded known poor location, and if so, then automatically storing the collected vehicle data for transmission from a different location.

* * * * *